United States Patent
Toriyama

(10) Patent No.: US 6,920,251 B2
(45) Date of Patent: Jul. 19, 2005

(54) IMAGE READING METHOD INCLUDING SHADING CORRECTION AND IMAGE READING DEVICE THEREFOR

(75) Inventor: Hideyuki Toriyama, Osaka (JP)

(73) Assignee: Minolta Co., Ltd., Osaka (JP)

( * ) Notice: Subject to any disclaimer, the term of this patent is extended or adjusted under 35 U.S.C. 154(b) by 657 days.

(21) Appl. No.: 09/901,012

(22) Filed: Jul. 10, 2001

(65) Prior Publication Data

US 2002/0021456 A1 Feb. 21, 2002

(30) Foreign Application Priority Data

Jul. 11, 2000 (JP) ........................................ 2000-209934

(51) Int. Cl.$^7$ .............................................. G06T 15/50
(52) U.S. Cl. .................................... 382/274; 358/461
(58) Field of Search ........................... 382/274; 358/461

(56) References Cited

U.S. PATENT DOCUMENTS 6,249,615 B1 * 6/2001 Kunishige .................... 382/274
6,360,009 B2 * 3/2002 Li et al. ....................... 382/176
6,658,164 B1 * 12/2003 Irving et al. ................. 382/274
6,704,457 B1 * 3/2004 Sugiura ....................... 382/274

FOREIGN PATENT DOCUMENTS

JP  10-243228   9/1998  .......... H04N/1/401
JP  10-271328   10/1998 .......... H04N/1/401

* cited by examiner

Primary Examiner—Daniel Miriam
Assistant Examiner—Dennis Rosario-Vasquez
(74) Attorney, Agent, or Firm—Morrison & Foerster LLP

(57) ABSTRACT

A peak value of readings of a reference plate is calculated by a peak value calculation means. The peak value is stored by a storage means. An average value of the readings of the reference plate is calculated by an average value calculation means. Difference data between the peak value and the average value is calculated by a difference data calculation means. A variable correction coefficient is set by a correction coefficient setting means through use of the difference data and the peak value as shading correction reference data. Readings of an document image is corrected by a correction means through use of the correction coefficient. Thereby, dispersion of document image readings in shading correction is decreased.

11 Claims, 7 Drawing Sheets

Fig.5

| n | BANK | delt | COMPENSATION COEFFICIENT |
|---|---|---|---|
| 0 | 0 | 0~2a | (255/FIFOout) * ((A0      )/A0) |
| 1 | 1 | 2a~4a | (255/FIFOout) * ((A0+2a)/A0) |
| 2 | 2 | 4a~6a | (255/FIFOout) * ((A0+4a)/A0) |
| 3 | 3 | 6a~8a | (255/FIFOout) * ((A0+6a)/A0) |
| 4 | 4 | 8a~10a | (255/FIFOout) * ((A0+8a)/A0) |

Fig.6

| n | delt | diff |
|---|---|---|
| 0 | 0~2a | 0 |
| 1 | 2a~4a | 2a |
| 2 | 4a~6a | 4a |
| 3 | 6a~8a | 6a |
| 4 | 8a~10a | 8a |

Fig.7

| n | delt | G1 |
|---|---|---|
| 0 | 0~2a | G0 * ((A0      )/A0) |
| 1 | 2a~4a | G0 * ((A0+2a)/A0) |
| 2 | 4a~6a | G0 * ((A0+4a)/A0) |
| 3 | 6a~8a | G0 * ((A0+6a)/A0) |
| 4 | 8a~10a | G0 * ((A0+8a)/A0) |

IMAGE READING METHOD INCLUDING SHADING CORRECTION AND IMAGE READING DEVICE THEREFOR

This application is based on application No. 2000-209934 filed in Japan, the entire content of which is hereby incorporated by reference.

BACKGROUND OF THE INVENTION

The present invention relates to an image reading method including shading correction and device therefor, and more particularly to an image reading method including peak-hold-type shading correction and device therefor.

Generally, image readers (IRs) for optically reading document images suffers luminous energy distortion i.e. shading in photoelectric-converted outputs from image sensors due to a luminescence property of a light source, an optical imaging characteristic, and ununiform sensitivity of image sensors such as CCD (Charge Coupled Device) linear sensors. Electronic correction of the shading is mainly achieved through an average value type method and a peak hold type method that are disclosed for example in Japanese Patent Laid-Open Publication No. HEI 10-271328.

In the average-value-type shading correction, image data for a plurality of lines on a shading plate (white plate) is read in advance, then an average value of the image data is calculated per set of corresponding pixels on each line as shading correction reference data, and upon reading of documents, document image data is corrected based on the correction reference data. The average-value-type shading correction is not easily effected by the influence of S/N (signal to noise) ratio of a system, but susceptible to "dirt" attached to the shading plates. In addition, the average-value-type shading correction requires a memory having a large capacity.

In the peak-hold-type shading correction, on the other hand, image data for a plurality of lines on a shading plate is read in advance, then a peak value of the image data is held per set of corresponding pixels on each line as shading correction reference data, and upon reading of documents, document image data is corrected based on the correction reference data. The peak-hold-type shading correction is not susceptible to "dirt" present on the shading plate and it does not require a large capacity of memory. However, the peak-hold-type shading correction is easily effected by the influence of S/N ratio.

Generally, since sufficient exposure was obtainable in the past, S/N ratio of a system was satisfactorily large and a difference "d" between a peak value "p" and an average value "a" upon reading was small as shown in FIG. 12A. Therefore, the peak hold method was used without any problem.

In recent years, however, it is difficult for digital copying machines and the like to obtain sufficient exposure from image readers because of demands for high CPM (copied pages per min.) and low power consumption. In addition, high resolution and high CPM increase clock frequencies, which generates larger noises in a GND (ground) line, resulting in insufficient voltage of analog image signals outputted by CCD sensors. Because of these reasons, S/N ratio of a system is getting small and a difference d' between a read peak value p' and an average value a' is increasing as shown in FIG. 12B. This increases a peak hold value (shading correction reference data) p', with which an amplification coefficient of the shading correction is decreased. For example, in the case where a white color in the same level as the shading plate is corrected to a step value of 255, the amplification coefficient is decreased from A to A'. As a result, an intensity level of the entire image is degraded, which causes a so-called "low-key" tendency. In the case of color copying machines, there arises a problem of change in shades of colors. More particularly, a sensitivity of color copying machines is generally different by RGB (red green blue), and therefore S/N ratio and a S/N ratio fluctuation amount are different per RGB. The color copying machines are usually tuned in such a way that identical RGB readings are obtained when a gray patch is read in a standard S/N ratio condition. However, the S/N ratio is different per RGB, which causes a phenomenon that a certain wavelength element is displaced in low-key direction whereas another wavelength element is displaced in high-key direction. As a result, dispersion is generated in readings between RGB, which causes change in shades of colors, that is, a color tone regardless of a gray patch.

In a system having inappropriate S/N ratio, the dispersion in the S/N ratio among individual machines is also large. Consequently, the S/N ratio causes larger dispersion in readings of an document image after application of shading correction, which makes the above-stated problems aggravated.

SUMMARY OF THE INVENTION

It is an object of the present invention to provide an image reading method and device performing a peak-hold-type shading correction, which is capable of decreasing dispersion in readings of document images after application of shading correction caused by S/N ratio.

In order to accomplish the above object, a first aspect of the present invention provides an image reading method for obtaining a shading correction coefficient for correcting image data obtained by reading a document image, comprising the steps of: reading a reference plate in a main scanning direction plural times at different positions in a sub-scanning direction perpendicular to the main scanning direction with use of a plurality of image sensors aligned in the main scanning direction; calculating difference per image sensor between a maximum value among a plurality of readings from each image sensor and an average value of readings from each image sensor; and obtaining the shading correction coefficient by modifying a correction coefficient for correcting the image data so that the maximum value of each image sensor becomes a specified image level in correspondence to the difference of each image sensor.

A second aspect of the present invention provides an image reading method for obtaining a shading correction coefficient for correcting image data obtained by reading a document image, comprising the steps of: reading a reference plate in a main scanning direction plural times at different positions in a sub-scanning direction perpendicular to the main scanning direction with use of a plurality of image sensors aligned in the main scanning direction; calculating difference per image sensor between a maximum value among a plurality of readings from each image sensor and an average value of readings from each image sensor; and obtaining the shading correction coefficient by adding a value corresponding to the difference of each image sensor to a correction coefficient so that the maximum value of each image sensor becomes a specified image level.

A third aspect of the present invention provides an image reading method for obtaining a shading correction coefficient for correcting image data obtained by reading a document image, comprising the steps of: reading a reference plate in a main scanning direction plural times at different positions in a sub-scanning direction perpendicular to the main scanning direction with use of a plurality of image sensors aligned in the main scanning direction; calculating difference between an average value of maximum values among a plurality of readings from each image sensor and an average value of readings from each image sensor; and obtaining the shading correction coefficient by modifying a correction coefficient for correcting the image data so that the maximum value of each image sensor becomes a specified image level in correspondence to the difference of each image sensor.

A fourth aspect of the present invention provides an image reading device for obtaining a shading correction coefficient for correcting image data obtained by reading a document image, comprising: a plurality of image sensors aligned in a main scanning direction; a calculation section for reading a reference plate in the main scanning direction plural times at different positions in a sub-scanning direction perpendicular to the main scanning direction with use of the image sensors and calculating difference between an average value of maximum values among a plurality of readings from each image sensor and an average value of readings from each image sensor; an operation section for obtaining the shading correction coefficient by modifying a correction coefficient for correcting the image data so that the maximum value of each image sensor becomes a specified image level in correspondence to the difference of each image sensor; and a correction section for correcting image data obtained by reading a document image with use of the image sensors through the shading correction coefficient.

A fifth aspect of the present invention provides an image reading method for obtaining a shading correction coefficient for correcting image data obtained by reading a document image, comprising the steps of: reading a reference plate in a main scanning direction plural times at different positions in a sub-scanning direction perpendicular to the main scanning direction with use of a plurality of image sensors aligned in the main scanning direction; calculating difference between an average value of maximum values among a plurality of readings from each image sensor and an average value of readings from each image sensor; and obtaining the shading correction coefficient by adding a value corresponding to the difference of each image sensor to a correction coefficient so that the maximum value of each image sensor becomes a specified image level.

A sixth aspect of the present invention provides an image reading device, comprising: a plurality of image sensors aligned in a main scanning direction; calculation means for reading a reference plate in the main scanning direction plural times at different positions in a sub-scanning direction perpendicular to the main scanning direction with use of the image sensors and calculating difference per image sensor between a maximum value among a plurality of readings from each image sensor and an average value of readings from each image sensor; amplification means for amplifying image signals read by the image sensors; and gain adjustment means for changing an amplification factor of the amplification means in correspondence to the calculated difference.

A seventh aspect of the present invention provides an image reading device, comprising: a plurality of image sensors aligned in a main scanning direction; calculation means for reading a reference plate in the main scanning direction plural times at different positions in a sub-scanning direction perpendicular to the main scanning direction with use of the image sensors and calculating difference between an average value of maximum values among a plurality of readings from each image sensor and an average value of readings from each image sensor; amplification means for amplifying image signals read by the image sensors; and gain adjustment means for changing an amplification factor of the amplification means in correspondence to the calculated difference.

A eighth aspect of the present invention provides an image reading device, comprising: amplification means for amplifying signals representing images of a reference intensity plate or an image document with a specified amplification factor to provide readings of the reference intensity plate or readings of the image document; peak value calculation means for calculating a peak value of the readings of the reference intensity plate; storage means for storing the peak value; average value calculation means for calculating an average value of the readings of the reference intensity plate; difference data calculation means for calculating difference data between the peak value and the average value; compensation coefficient setting means for setting a compensation coefficient through use of the peak value stored in the storage means as shading compensation reference data; compensation means for compensating readings of the image document through use of the compensation coefficient; and gain adjustment means for changing the amplification factor of the amplification means according to the difference data so as to make the amplification factor for use in the case where the amplification means amplifies signals representing images of the reference intensity plate different from the amplification factor for use in the case where the amplification means amplifies signals representing images of the image document.

It is noted that the "reference plate" refers to a plate having reference intensity, provided for obtaining shading correction reference data, and the "readings of a reference plate" refer to data values obtained through optical reading of such a reference plate. The "image data obtained by reading a document image" refer to image data values obtained through optical reading of an document image with use of the same optical reading system as in reading the reference plate.

BRIEF DESCRIPTION OF THE DRAWINGS

The present invention will become more fully understood from the detailed description given hereinbelow and the accompanying drawings which are given by way of illustration only, and thus are not limitative of the present invention, and wherein:

FIG. 5 shows correction coefficients for use in implementing the first shading correction;

FIG. 6 shows values to be subtracted from data values outputted from a FIFO memory by a subtracter upon reading of a shading plate in implementing the second shading correction;

FIG. 7 shows variable amplification factors of a gain circuit in implementing third shading correction;

DETAILED DESCRIPTION OF THE PREFERRED EMBODIMENTS

Hereinbelow, the present invention will be described in detail with reference to illustrated embodiments.

Figure 11:
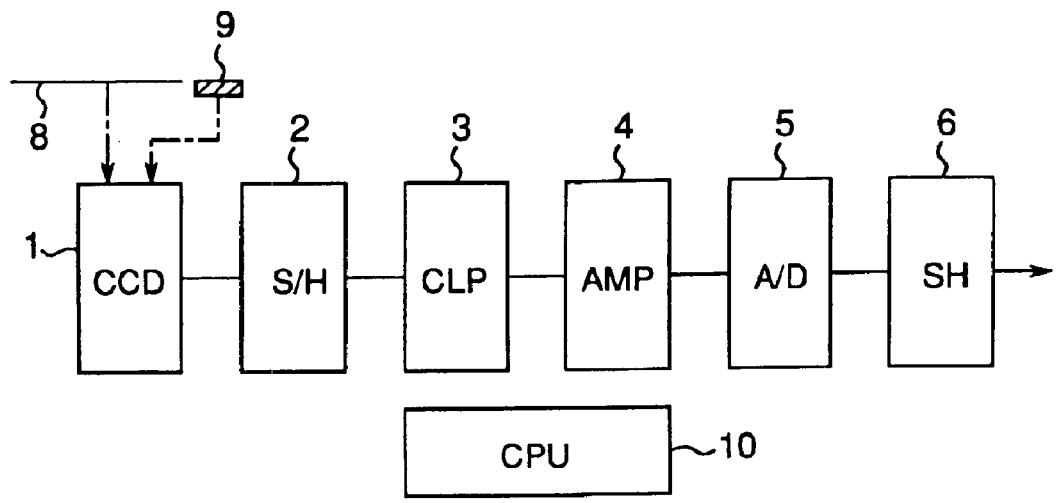
FIG. 11 shows a schematic block structure of the image reading device in one embodiment of the present invention applied to an image reader of a color digital copying machine.
Figure 12A:
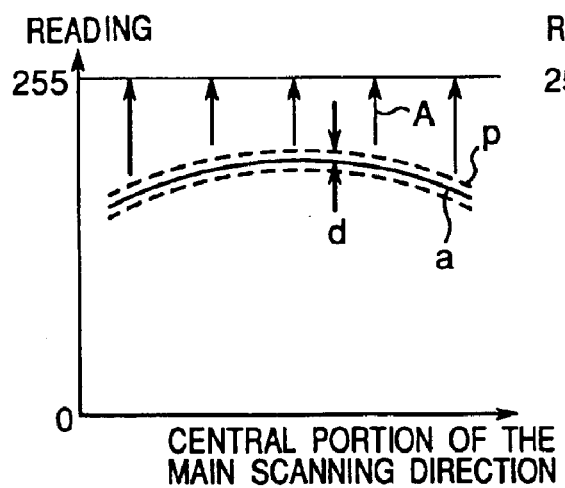
FIGS. 12A and 12b show schematic views for indicating a problem of shading correction when large noises are present in a system.
Figure 12B:
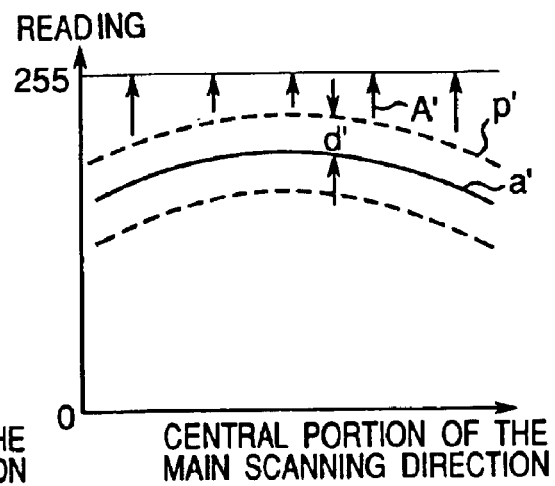

FIG. 11 shows a schematic block structure of an image reading device in one embodiment of the present invention, which device is applied to an image reader (IR) of an electro-photographic digital color copying machine. The image reading device is equipped with a CCD-type line sensor (hereinafter referred to as a "CCD sensor") 1, a sample hold section (S/H) 2, a clamp circuit (CLP) 3, a gain circuit as an amplification means (AMP) 4, an A/D conversion section (A/D) 5, a shading correction section (SH) 6, and a central processing unit (CPU) 10 for controlling the entire image reading device. A document 8 or a shading plate 9 having a white level reference density is radiated by a fluorescent lamp (unshown) as a light source, and a reflected ray of light thereof travels through an optical system (unshown) and becomes incident on the CCD sensor 1. The shading correction plate 9 is actually long and slender in a main scanning direction like the CCD sensor 1.

The CCD sensor 1 conducts photoelectric conversion of light from the document 8 or the shading plate 9, and outputs analog signals composed of color analyzing information of each R (red), G (green) and B (blue) color. The sample hold section 2 holds valid signal parts of the analog signals and sends them to the clamp circuit 3. The clamp circuit 3 regulates offset amount of black level in relation to the analog signals, and sends them to the gain circuit 4. The gain circuit 4 amplifies the analog signals with a specified amplification factor, and transmits them to the A/D conversion section 5. The A/D conversion section 5 converts the analog signals to 8-bit (256 steps) digital data per R, G and B color information based on a timing signal transferred from the CPU 10, and then sends them to the shading correction section 6. The shading correction section 6 executes peak-hold-type shading correction of the digital data, and forwards them to a following unshown image processing circuit (such as a color aberration correcting section).

In general, peak-hold-type shading correction is performed as follows. Image data for a plurality of lines on the shading plate 9 are read in advance, and then a peak value of the image data is held per corresponding pixel on each line as reference data of shading correction. Upon reading of a document, the shading correction section 6 uses the correction reference data to correct readings of the document image so that the shading is eliminated.

Figure 1:
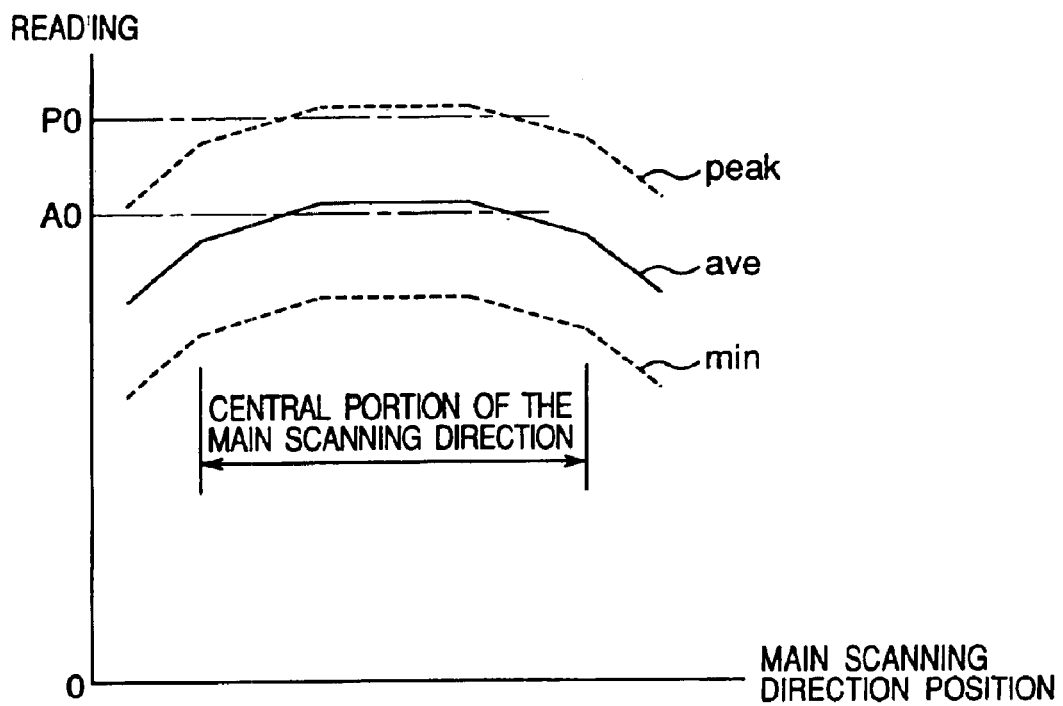
FIG. 1 exemplifies a reading wavelength of a shading plate in the case where an optical reading system contains a certain degree of noise and therefore S/N ratio is inappropriate.

FIG. 1 exemplifies reading wavelengths of a shading plate 9 in the case where an optical reading system contains a certain degree of noise elements and therefore S/N ratio is inappropriate. Here, a horizontal axis represents a main scanning direction position, whereas a vertical axis represents reading (0 indicates a black level). Reflecting noises of the system, the readings are dispersed from a lower dotted wave line representing a minimum value "min" to an upper doted wave line representing a peak value peak, between which a line of an average value "ave" is interposed. P0 and A0 each denote an average value obtained by averaging the peak value "peak" and the average value "ave" of pixels in a central portion of the main scanning direction as a valid area, the central portion of which is indicated by a range with arrows in FIG. 1. Difference data "delt" obtained by subtracting a value A0 from a value P0 corresponds to a noise amount (S/N ratio).

Figure 2:
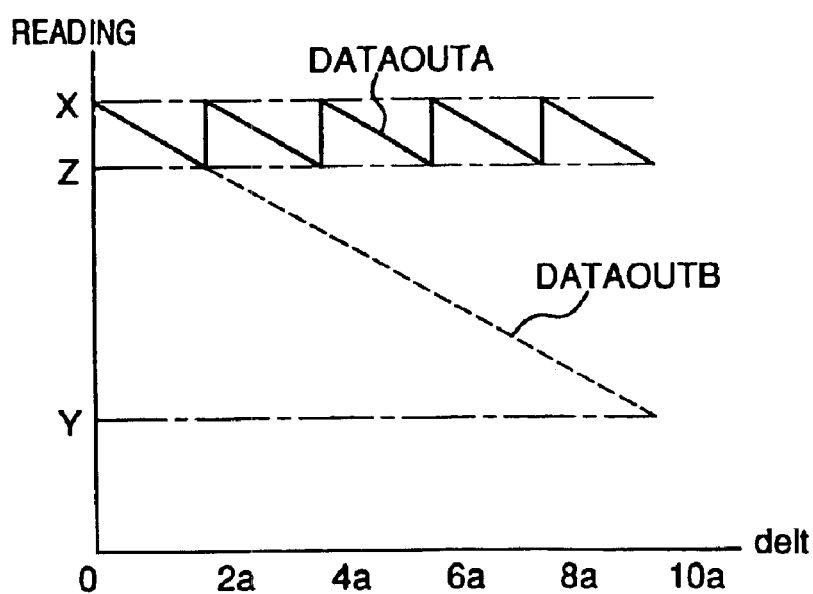
FIG. 2 shows readings of an document image after a shading correction according to one embodiment of the present invention in comparison with a prior art shading correction.

FIG. 2 shows readings of an document image after a shading correction according to the present invention in comparison with a prior art shading correction so as to represent how the readings of a document having a certain density vary in response to a noise amount. In FIG. 2, a horizontal axis represents the "delt(=P0−A0)" shown in FIG. 1, whereas a vertical axis represents readings. Zero on the vertical axis refers to a black level.

In the prior art peak-hold-type shading correction, as shown with a broken straight line DATAOUTB, increase of the difference data "delt" from 0 to 10a decreases the readings from X to Y in proportion thereto.

More particularly, in FIG. 2, X refers to a reading of a certain density patch after shading correction in the case where no noise (delt=0) is present in the system. The reading X is expressed by the following numerical formula:

$$X = X0 \times (255/A0) \tag{1}$$

where 255 is a white level (shading plate) target value, A0 is a peak hold value of a shading plate in the case of no noise and equal to an average value thereof, and X0 is an average reading of a density patch before application of shading correction.

In the case where a certain noise amount is present, for example, where a noise amount "delt" equals to a maximum value 10a, the reading Y after application of shading correction is expressed as follows:

$$Y = X0 \times (255/(A0+10a)) = X \times A0/(A0+10a) \tag{2}$$

In the prior art, as is clear from the above numerical formulas (1) and (2), the difference data "delt" increasing from 0 to 10a decreases the reading from X to Y in proportion thereto, and the more a reading target density approximates to a white level, the larger the difference (X−Y) becomes.

On the other hand, the following shading corrections of the present invention is implemented in order to decrease dispersion caused by the influence of S/N ratio in readings of document images after the shading correction, as shown in sawtooth wave DATAOUTA depicted with a solid line in FIG. 2.

Figure 3:
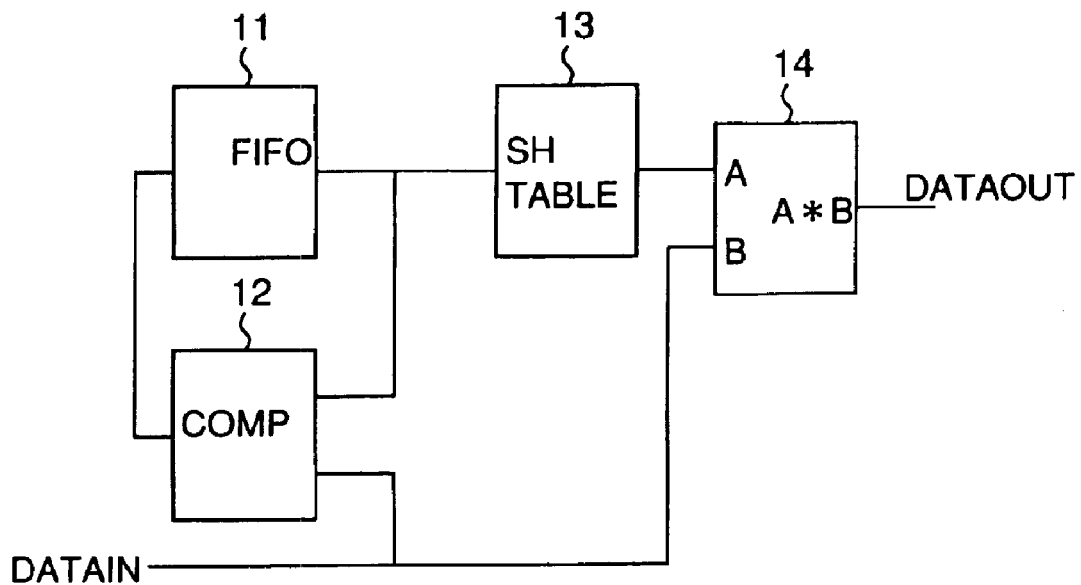
FIG. 3 shows a circuitry of a shading correction section for implementing a first shading correction according to the present invention.

FIG. 3 shows an example of circuitry of the shading correction section 6 for a first shading correction according to the present invention. In this example, the shading correction section 6 is equipped with a FIFO (first-in first-out) memory 11 as a storage means for storing shading correction reference data, a comparator (COMP) 12, a RAM 13 for storing a correction coefficient table (SHTABLE), and a multiplier 14.

During reading of shading correction reference data, the comparator 12 compares uncorrected reading DATAIN and output data from the FIFO memory 11, and selects larger one therefrom to send it to an input terminal of the FIFO memory 11. Thus, a peak value of uncorrected readings upon reading of a shading plate is stored in the FIFO memory 11 as shading correction reference data. Output data (a peak hold value) of the FIFO memory 11 called FIFOout is connected to an address of the RAM 13. In the RAM 13, there is stored a correction coefficient table (SHTABLE) shown in FIG. 5.

In the correction coefficient table, difference data "delt" (=P0−A0), which corresponds to a noise amount, is divided into five ranges i.e. five banks of 0 to 2a, 2a to 4a, 4a to 6a, 6a to 8a, and 8a to 10a, and there is stored a correction coefficient of the difference data "delt" corresponding to each bank upon reading of a shading plate. The first factor of the correction coefficients is (255/FIFOout). The denominator FIFOout represents a peak hold value outputted from the FIFO memory 11. Therefore, the first factor (255/FIFOout) of the correction coefficients indicates that a white level target value i.e. a white level of the shading plate should be set to a maximum step value 255.

In the case of a bank 0 where noises are small and the difference data "delt" is in the range of 0 (no noise) to 2a, the second factor equals to ((A0)/(A0))=1, and therefore the correction coefficient is (255/FIFOout). In the case of a bank 1 where noises are slightly increased and the difference data "delt" is in the range of 2a to 4a, the second factor equals to ((A0+2a)/A0)), so that the correction coefficient is increased from (255/FIFOout) by that incremental portion. In the same way, in the case of a bank 2 where the difference data "delt" is in the range of 4a to 6a, the second factor equals to ((A0+4a)/A0)), so that the correction coefficient is increased from (255/FIFOout) by that incremental portion. In the case of a bank 3 where the difference data "delt" is in the range of 6a to 8a, the second factor equals to ((A0+6a)/A0)), so that the correction coefficient is increased from (255/FIFOout) by that incremental portion. In the case of a bank 4 where the difference data "delt" is in the range of 8a to 10a, the second factor equals to ((A0+8a)/A0)), so that the correction coefficient is increased from (255/FIFOout) by that incremental portion.

Figure 8:
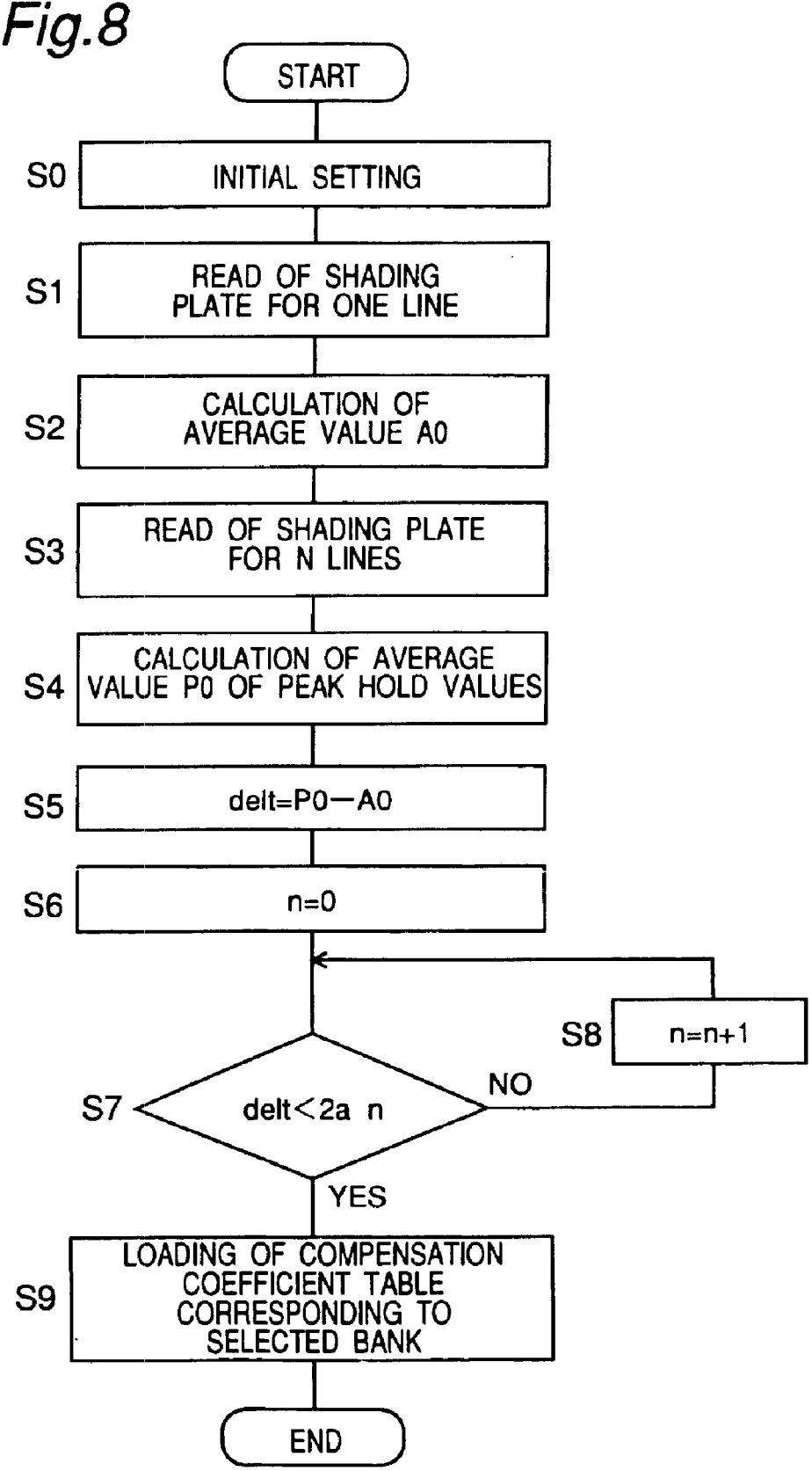
FIG. 8 shows a sequence of the implementing first shading correction.

FIG. 8 shows a sequence executed by the CPU 10 of FIG. 11 for setting the correction coefficient table for use in first shading correction.

First, each part in the shading correction section 6 is initialized (S0). Next, data for one line on the shading plate is read out (S1). Then, one line data is written onto the FIFO memory 11 for storing peak hold values. Out of the written data, data on pixels included in a central portion of the main scanning direction is read out and averaged in relation to the main scanning direction so that an average value A0 is obtained (S2). Next, data on the shading plate is read out N times and peak hold values thereof are written onto the FIFO memory 11 (S3). Upon completion of writing, data on the pixels included in the central portion of the main scanning direction is read out, and averaged in relation to the main scanning direction so that an average value PO is obtained (S4). Then, difference data delt=P0−A0 is calculated (S5).

Next, a parameter "n" for selecting a bank is set to 0 (S6), and determination is made if a value of the difference data "delt" is smaller than 2a×n or not (S7). If the value of the difference data "delt" is not smaller than 2a×n, gradual increment of the value "n" is implemented, and a bank "n" to which the difference data "delt" belongs is finally selected (S8). Then, the correction coefficient table (SHTABLE) corresponding to the selected bank "n" is loaded to the RAM 13 (S9).

Upon reading of a document, the multiplier 14 shown in FIG. 3 multiplies an uncorrected reading DATAIN by a correction coefficient read from the correction coefficient table (SHTABLE) in the RAM 13, and outputs multiplication result DATAOUT. The multiplication result DATAOUT is expressed by following five formulas (3) in accordance with the bank "n", i.e. the range of difference data "delt".

When delt=0 to 2a,

DATAOUT=(255/FIFOout)×((A0)/A0)×DATAIN

When delt=2a to 4a,

DATAOUT=(255/FIFOout)×((A0+2a)/A0)×DATAIN

When delt=4a to 6a,

DATAOUT=(255/FIFOout)×((A0+4a)/A0)×DATAIN

When delt=6a to 8a,

DATAOUT=(255/FIFOout)×((A0+6a)/A0)×DATAIN

When delt=8a to 10a,

DATAOUT=(255/FIFOout)×((A0+8a)/A0)×DATAIN     (3)

According to the formulas (3), a reading result when conducting the first shading correction shows a sawtooth wave DATAOUTA depicted with a solid line in FIG. 2. Therefore, compared to peak-hold-type shading correction based on the prior art (shown as DATAOUTB drawn with broken straight line), the dispersion in readings after application of shading correction caused by the influence of S/N ratio can be decreased.

More particularly, a dispersion amount (X−Y) in the case of the prior art equals to:

$$X - Y = X - X \times A0/(A0 + 10a)$$
$$= X \times 10a/(A0 + 10a)$$

Next, in obtaining a dispersion amount (X−Z) in the case of implementing the first shading correction, a lower limit value Z of dispersion equals to:

$$Z = X \times A0/(A0+2a) \text{ (provided that } A0 >> 10a)$$

Therefore, a dispersion amount (X−Z) in the case of implementing the first shading correction is obtained by the following formula:

$$X - Z = X - X \times A0/(A0 + 2a)$$
$$= X \times 2a/(A0 + 2a)$$

Consequently, comparison of a dispersion amount of readings between the shading correction based on the prior art and the first shading correction is expressed as follows:

$$(X-Y)/(X-Y)=(X \times Sa/(A0+2a))/(X \times 10a/(A0+10a))=(2a/(A0+2a))/(10a/(A0+10a))=(1/(A0+2a))/(5/(A0+10a)) \text{ almost equal to } 1/5 \text{ (as } A0>>10a)$$

Therefore, the first shading correction can decrease the dispersion in readings of an document image to approximately one fifth of the prior art shading correction.

Figure 4:
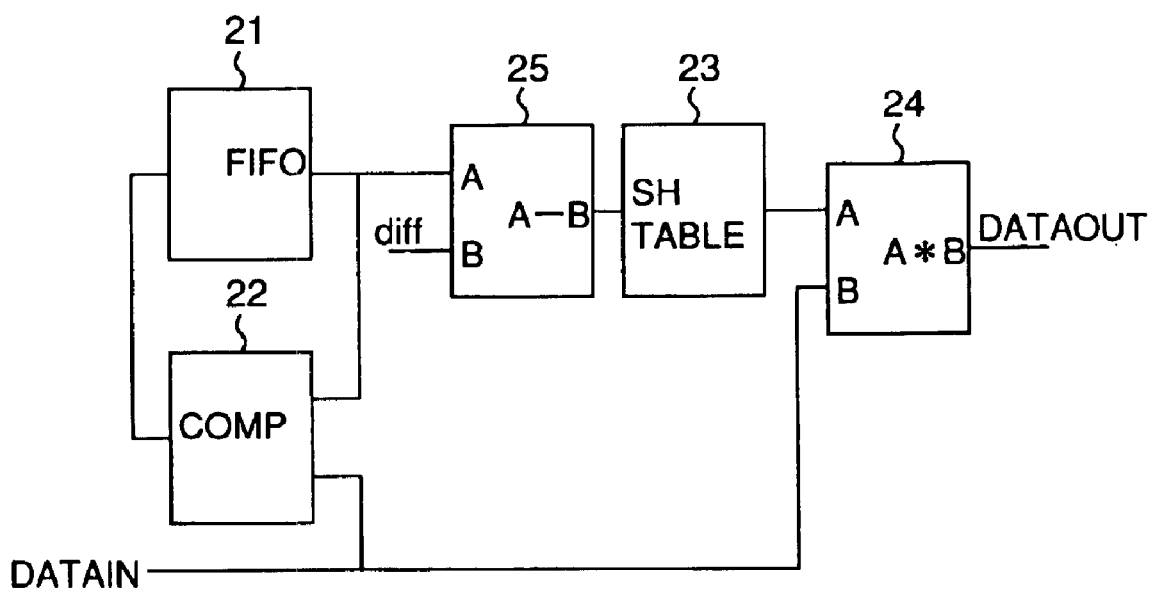
FIG. 4 shows a circuitry of a shading correction section for implementing a second shading correction according to the present invention.

FIG. 4 shows a circuitry example of the shading correction section 6 for a second shading correction according to the present invention. In this example, the shading correction section 6 is equipped with a FIFO memory 21 as a storage means for storing shading correction reference data, a comparator (COMP) 22, a subtracter 25, a RAM 23 for storing a correction coefficient table (SHTABLE), and a multiplier 24.

During reading of shading correction reference data, as in the case of the previous example, the comparator 22 compares uncorrected reading DATAIN and output data from the FIFO memory 21, and selects larger one therefrom to send it to an input terminal of the FIFO memory 21. Thus, a peak value of uncorrected readings upon reading of a shading plate is stored in the FIFO memory 21 as a shading correction reference data. A specified value "diff" described hereinafter is subtracted from FIFOout, that is output data of the FIFO memory 21 (a peak hold value), and then the FIFOout is connected to an address of the RAM 23. In the RAM 23, there is stored in this example, data on a correction coefficient table (SHTABLE) as described below.

$$255/(\text{FIFOout-diff}) \tag{4}$$

FIG. 6 shows values of "diff" to be subtracted from a data value outputted from a FIFO memory 21 by a subtracter 25 upon reading of a shading plate. The difference data "delt" (=P0–A0), which corresponds to a noise amount, is divided into five ranges (banks) of 0 to 2a, 2a to 4a, 4a to 6a, 6a to 8a and 8a to 10a. Upon reading of a shading plate, the value "diff" is set in accordance with each bank of the difference data "delt".

In the case of a bank 0 where noises are small and the difference data "delt" is in the range of 0 to 2a, the value "diff" is set to zero. In the case a bank 1 where noises are slightly increased and the difference data "delt" is in the range of 2a to 4a, the value "diff" is set to 2a. In the case of a bank 2 where the difference data "delt" is in the range of 4a to 6a, the value "diff" is set to 4a. In the case of a bank 3 where the difference data "delt" is in the range of 6a to 8a, the value "diff" is set to 6a. In the case of a bank 4 where the difference data "delt" is in the range of 8a to 10a, the value "diff" is set to 8a.

Figure 9:
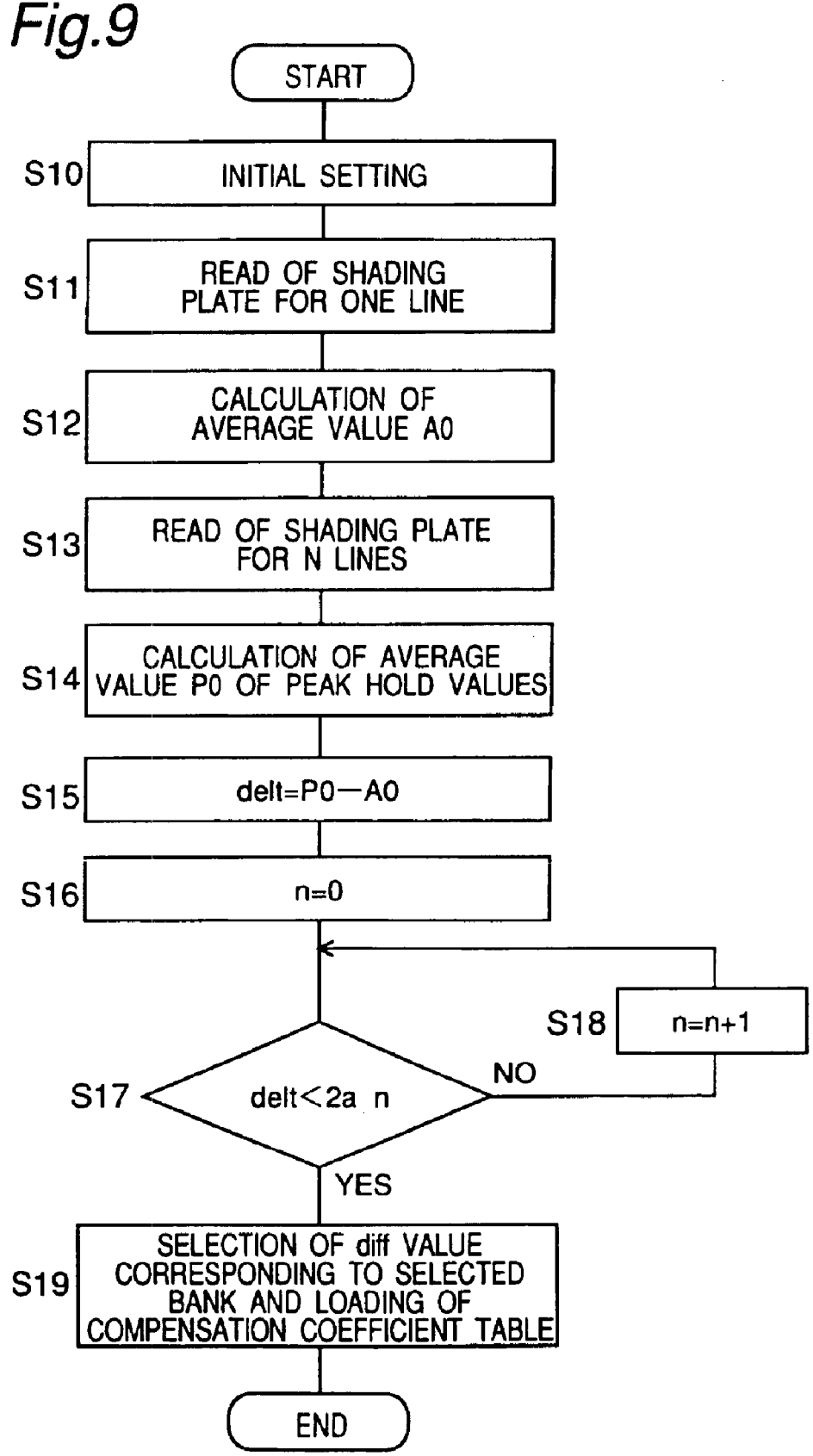
FIG. 9 shows a sequence of implementing the second shading correction.

FIG. 9 shows a sequence executed by the CPU 10 for setting the correction coefficient table for use in the second shading correction.

First, each part in the shading correction section 6 is initialized (S10). In this example in particular, the parameter "diff" is set to 0. Next, as with the first shading correction, data for one line on a shading plate is read out (S11). Then, one line data is written onto the FIFO memory 11 dedicated for storing peak hold values. Out of the written data, data on pixels included in a central portion of the main scanning direction is read out and averaged in relation to main scanning direction so that an average value A0 is obtained (S12). Next, data on the shading plate is read out N times and peak hold values thereof are written onto the FIFO memory 11 (S13). Upon completion of writing, data on the pixels included in the central portion of the main scanning direction is read out, and averaged in main scanning direction so that an average value PO is obtained (S14). Then, difference data "delt"=P0–A0 is calculated (S15).

Next, a parameter "n" for selecting a bank is set to 0 (S16), and determination is made if a value of the difference data "delt" is smaller than 2an or not (S17). If the value of the difference data "delt" is not smaller than 2an, gradual increment of the value n is implemented, and a bank n to which the difference data "delt" belongs is finally selected (S18). Then, a value "diff" corresponding to the selected bank n is selected, and the correction coefficient table (SHTABLE) expressed with the above-stated formula (4) is loaded to the RAM 13 (S19).

Upon reading of a document, the multiplier 24 shown in FIG. 4 multiplies an uncorrected reading DATAIN by a correction coefficient read from the correction coefficient table (SHTABLE) in the RAM 13, and outputs a multiplication result DATAOUT. The multiplication result DATAOUT is expressed by following five formulas (5) in accordance with the bank "n", i.e. the range of difference data "delt".

When delt=0 to 2a,

DATAOUT=(255/FIFOout)×DATAIN

When delt=2a to 4a,

DATAOUT=(255/(FIFOout−2a))×DATAIN

When delt=4a to 6a,

DATAOUT=(255/(FIFOout−4a))×DATAIN

When delt=6a to 8a,

DATAOUT=(255/(FIFOout−6a))×DATAIN

When delt=8a to 10a, $$\text{DATAOUT}=(255/(\text{FIFOout}-8a))\times\text{DATAIN} \tag{5}$$

According to the formulas (5), a reading result when conducting the second shading correction shows a sawtooth wave DATAOUTA depicted with a solid line in FIG. 2 as with the case of conducting the first shading correction. Therefore, compared to peak-hold-type shading correction based on the prior art (shown as DATAOUTB drawn with broken straight line), the dispersion in readings after application of shading correction caused by the influence of S/N ratio can be decreased.

In a third shading correction according to the present invention, the shading correction section 6 has a block structure identical to that shown in FIG. 3. Further, in this example, the following is stored in the RAM 13 as contents of the correction coefficient table SHTABLE like the case of the prior art:

$$255/(\text{FIFOou}) \tag{6}$$

In the third shading correction, however, an amplification factor of the gain circuit AMP 4 shown in FIG. 11 is so changed as to eliminate the influence of S/N ratio on readings. Although not mentioned in the case of the first and second shading corrections for the purpose of simplification, the amplification factor of the gain circuit 4 is set to a constant amplification factor G0 during reading both the shading plate and the document images.

FIG. 7 shows a variable amplification factor G1 of the gain circuit 4. The difference data "delt" (=P0–A0) that corresponds to a noise amount is divided into 5 ranges (banks) of 0 to 2a, 2a to 4a, 4a to 6a, 6a to 8a and 8a to 10a. The amplification factor G1 is set in accordance with each bank of the difference data "delt" upon reading of a shading plate. The dividing rule thereof is identical to that in the case of the first and the second shading corrections. In the case of a bank 0 where noises are small and the difference data "delt" is in the range of 0 to 2a, the amplification factor G1 is set to G1=G0×((A0)/A0)=G0. In the case of a bank 1 where noises are slightly increased and the difference data "delt" is in the range of 2a to 4a, the amplification factor G1 is set to G1=G0×((A0+2a)/A0). In the case of a bank 2 where the difference data "delt" is in the range of 4a to 6a, the amplification factor G1 is set to G1=G0×((A0+4a)/A0). In the case of a bank 3 where the difference data "delt" is in the range of 6a to 8a, the amplification factor G1 is set to $G1=G0\times((A0+6a)/A0)$. In the case of a bank 4 where the difference data "delt" is in the range of 8a to 10a, the amplification factor G1 is set to $G1=G0\times((A0+8a)/A0)$.

Figure 10:
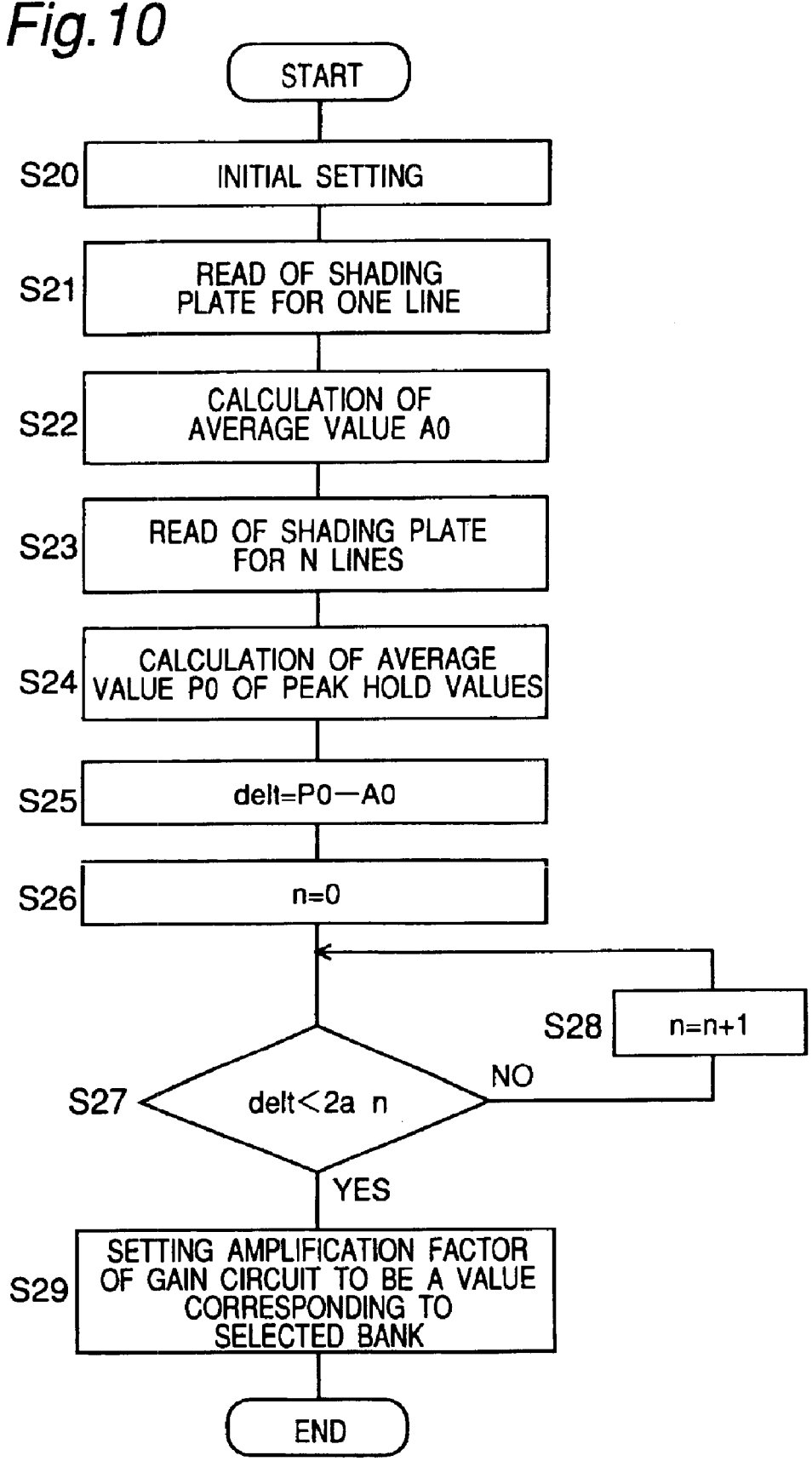
FIG. 10 shows a sequence of implementing the third shading correction.

FIG. 10 shows a sequence for setting an amplification factor G1 of the gain circuit 4 for use in implementing the third shading correction.

First, each part in the shading correction section 6 is initialized (S20). In this example in particular, the parameter is set to G1=G0. Next, as with the first and the second shading corrections, data for one line on a shading plate is read out (S21). More particularly, the CCD sensor 1 shown in FIG. 11 conducts photoelectric conversion of light from the shading plate 9, and outputs analog signals composed of R, G, and B. The sample hold section 2 holds valid signal parts of the analog signals and sends them to the clamp circuit 3. The clamp circuit 3 regulates a black level offset amount in relation to the analog signals, and sends the signals to the gain circuit 4. The gain circuit 4 amplifies the analog signals with an amplification factor G0, and transmits them to the A/D conversion section 5. The A/D conversion section 5 converts the analog signals to 8-bit (256steps) digital data per R, G, and B color information based on a timing signal transferred from the CPU 10, and sends them to the shading correction section 6. In the shading correction section 6, one line data is written onto the FIFO memory 11 shown in FIG. 3. Out of the written data, data on pixels included in a central portion of the main scanning direction is read out and averaged in relation to main scanning direction so that an average value A0 is obtained (S22). Next, data on the shading plate is read out N times and peak hold values thereof are written onto the FIFO memory 11 (S23). Upon completion of writing, data on the pixels included in the central portion of the main scanning direction is read out, and averaged in main scanning direction so that an average value PO is obtained (S24). Then, difference data "delt"=P0−A0 is calculated (S25).

Next, a parameter "n" for selecting a bank is set to 0 (S26), and determination is made if a value of the difference data "delt" is smaller than 2axn or not (S27). If the value of the difference data "delt" is not smaller than 2axn, gradual increment of the value "n" is implemented, and a bank "n" to which the difference data "delt" belongs is finally selected (S28). Then, the amplification factor of the gain circuit 4 is set to a G1 value corresponding to the selected bank "n" (S29).

Upon reading of a document, the CCD sensor 1 shown in FIG. 11 conducts photoelectric conversion of light from the document 8, and outputs analog signals of R, G, and B. The sample hold section 2 holds valid signal parts of the analog signals and sends them to the clamp circuit 3. The clamp circuit 3 regulates a black level offset amount of the analog signals, and sends the signals to the gain circuit 4. The gain circuit 4 amplifies the analog signals with an amplification factor G1, and transmits them to the A/D conversion section 5. The A/D conversion section 5 converts the analog signals to 8-bit (256 steps) digital data per R, G, and B color information based on a timing signal transferred from the CPU 10, and sends them to the shading correction section 6. In the shading correction section 6, the multiplier 14 shown in FIG. 3 multiplies an uncorrected reading DATAIN by a correction coefficient read from the correction coefficient table (SHTABLE) in the RAM 13, and outputs a multiplication result DATAOUT. The multiplication result DATAOUT is expressed by the following five formulas (7) in accordance with bank "n" i.e. the range of the difference data "delt" (provided that a factor G0 is omitted for simplification).

When delt=0 to 2a, $$DATAOUT=(255/FIFOout)\times((A0)/A0)\times DATAIN$$

When delt=2a to 4a, $$DATAOUT=(255/FIFOout)\times((A0+2a)/A0)\times DATAIN$$

When delt=4a to 6a, $$DATAOUT=(255/FIFOout)\times((A0+4a)/A0)\times DATAIN$$

When delt=6a to 8a, $$DATAOUT=(255/FIFOout)\times((A0+6a)/A0)\times DATAIN$$

When delt=8a to 10a, $$DATAOUT=(255/FIFOout)\times((A0+8a)/A0)\times DATAIN \qquad (7)$$

According to the formulas (7), a reading result when conducting the third shading correction shows a sawtooth wave DATAOUTA depicted with a solid line in FIG. 2 as with the case of conducting the first and the second shading corrections. Therefore, compared to peak-hold-type shading correction based on the prior art (shown as DATAOUTB drawn with broken straight line), the dispersion in readings after application of shading correction under influence of S/N ratio can be decreased.

In this embodiment, the difference data "delt" (=P0−A0) that corresponds to a noise amount is divided into five ranges (banks) of 0 to 2a, 2a to 4a, 4a to 6a, 6a to 8a, and 8a to 10a. According to these banks, the correction coefficient of the shading correction section 6 and the amplification factor of the gain circuit 4 are regulated. However, the number of the banks is not limited to five. The number of the banks may be selected so that the dispersion in readings attributed to fluctuation of S/N ratio can be confined to a permissible level which is specified by a product specification setting and the like. For example, the number of banks may be two. The upper limit in the number of the banks is infinite. Therefore, the correction coefficient of the shading correction section 6 and the amplification factor of the gain circuit 4 may be continuously regulated. In that case, diff=delt is set in the second shading correction for example.

In order to calculate a peak value P0 and an average value A0 in reading the shading plate, data on pixels included in a central portion of each main scanning direction is averaged in relation to the main scanning direction. The reason why the plurality of pixels are subjected to calculation is to avoid such an adverse influence as the problematic dispersion in measurement in a system having an inappropriate S/N ratio. Therefore, if the influence due to the dispersion in measurement does not become a problem, only one pixel in the central portion of the main scanning direction may be subjected to calculation. In that case, the image reading device may have a structure in which the difference data "delt" of each pixel of the main scanning direction is calculated per pixel, and the correction coefficient also takes a different value per pixel of the main scanning direction.

Generally, it is known that readings on a shading plate is different by luminous intensity distribution properties and by a main scanning direction position, while the difference data "delt" is approximately constant regardless of the position of the main scanning direction. Therefore, there is no problem about obtaining a peak value P0 and an average value A0 by averaging in main scanning direction data on a plurality of pixels in a central portion of the main scanning direction in this embodiment. In addition, if dirt is attached to the shading plate, the influence thereof is negligible because pixels in wide ranges are subjected to calculation.

In the above embodiments, the average of peak values is obtained by averaging maximum output values from each CCD sensor aligned in the main scanning direction. The average of readings is obtained by averaging output values of one line obtained from each CCD sensor after once reading the shading plate. Difference of these average values is obtained per line and used for shading correction and gain adjustment. However, it may be possible to obtain difference per CCD i.e. per pixel. More specifically, the shading plate is read at an identical position or different positions plural times, and a peak value (maximum value) is obtained from plural readings from each CCD. Then, there is obtained an average value of the plural readings obtained from each CCD. Finally, there is obtained difference between the average value and the peak value. By using this difference per pixel, shading correction and gain adjustment per pixel may be performed.

In the above embodiments, the average of readings of the reference plate is obtained by averaging readings of one line. However, it may be obtained by using all or part of readings of plural lines.

The invention being thus described, it will be obvious that the invention may be varied in many ways. Such variations are not be regarded as a departure from the spirit and scope of the invention, and all such modifications as would be obvious to one skilled in the art are intended to be included within the scope of the following claims.

What is claimed is:

1. An image reading method for obtaining a shading correction coefficient for correcting image data obtained by reading a document image, comprising the steps of:

reading a reference plate in a main scanning direction plural times at different positions in a sub-scanning direction perpendicular to the main scanning direction with a use of a plurality of image sensors aligned in the main scanning direction;

calculating a difference per image sensor between a maximum value among a plurality of readings from each image sensor and an average value of readings from each image sensor; and obtaining the shading correction coefficient by adding a value corresponding to the difference of each image sensor to a correction coefficient so that the maximum value of each image sensor becomes a specified image level.

2. The image reading method for obtaining a shading correction coefficient as defined in claim 1, wherein the average value of readings from each image sensor is an average value of readings obtained by once reading a reference plate in the main scanning direction.

3. The image reading method for obtaining a shading correction coefficient as defined in claim 1, wherein the average value of readings from each image sensor is an average value readings obtained by reading the reference plate in the main scanning direction plural times.

4. An image reading method for obtaining a shading correction coefficient for correcting image data obtained by reading a document image, comprising the steps of:

reading a reference plate in a main scanning direction plural times at different positions in a sub-scanning direction perpendicular to the main scanning direction with a use of a plurality of image sensors aligned in the main scanning direction;

calculating a difference between an average value of maximum values among plurality of readings from each image sensor and an average value of readings from each image sensor; and obtaining the shading correction coefficient by modifying a correction coefficient for correcting the image data so that the maximum value of each image sensor become a specified image level in correspondence to the difference of each image sensor.

5. The image reading method for obtaining a shading correction coefficient as defined in claim 4, wherein the average value of readings from each image sensor is an average value of readings obtained by once reading a reference plate in the main scanning direction.

6. The image reading method for obtaining a shading correction coefficient as defined in claim 4, wherein the average value of readings from each image sensor is an average value of readings obtained by reading the reference plate in the main scanning direction plural times.

7. An image reading device for obtaining a shading correction coefficient for correcting image data obtained by reading a document image, comprising:

a plurality of image sensors aligned in a main scanning direction;

a calculation section for reading a reference plate in the main scanning direction plural times at different positions in a sub-scanning direction perpendicular to the main scanning direction with a use of the image sensors and calculating a difference between an average value of maximum values among a plurality of readings from each image sensor and an average value of readings from each image sensor;

an operation section for obtaining the shading correction coefficient by modifying a correction coefficient for correcting the image data so that the maximum value of each image sensor becomes a specified image level in correspondence to the difference of each image sensor; and a correction section for correcting image data obtained by reading a document image with use of the image sensors through the shading correction coefficient.

8. An image reading method for obtaining a shading correction coefficient for correcting image data obtained by reading a document image, comprising the steps of:

reading a reference plate in a main scanning directing plural times at different positions in a sub-scanning direction perpendicular to the main scanning direction with a use of a plurality of image sensors aligned in the main scanning direction;

calculating a difference between an average value of maximum values among a plurality of readings from each image sensor and an average value of readings from each image sensor; and obtaining the shading correction coefficient by adding a value corresponding to the difference of each image sensor to a correction coefficient so that the maximum value of each image sensor becomes a specified image level.

9. An image reading device, comprising:

a plurality of image sensors aligned in a main scanning direction;

calculation means for reading a reference plate in the main scanning direction plural times at different positions in a sub-scanning direction perpendicular to the main scanning direction with a use of the image sensors and calculating a difference per image sensor between a maximum value among a plurality of readings from each image sensor and an average value of readings from each image sensor;

amplification means for amplifying image signals read by the image sensors; and gain adjustment means for changing an amplification factor of the amplification means in correspondence to the calculated difference.

10. An image reading device, comprising:

a plurality of image sensors aligned in a main scanning direction;

calculating means for reading a reference plate in the main scanning direction plural times at different positions in a sub-scanning direction perpendicular to the main scanning direction with a use of the image sensors and calculating a difference between an average value of maximum values among a plurality of readings from each image sensor and an average value of readings from each image sensor;

amplification means for amplifying image signals read by the image sensors; and gain adjustment means for changing an amplification factor of the amplification means in correspondence to the calculated difference.

11. An image reading device, comprising:

amplification means for amplifying signals representing images of a reference intensity plate or an image document with a specified amplification factor to provide readings of the reference intensity plate or readings of the image document;

peak value calculation means for calculating a peak value of the readings of the reference intensity plate;

storage means for storing the peak value;

average value calculation means for calculating an average value of the readings of the reference intensity plate;

difference data calculation means for calculating a difference data between the peak value and the average value;

compensation coefficient setting means for setting a compensation coefficient through a use of the peak value stored in the storage means as shading compensation reference data;

compensation means for compensating readings of the image document through a use of the compensation coefficient; and gain adjustment means for changing the amplification factor of the amplification means according to the difference data so as to make the amplification factor for a use in the case where the amplification means amplifies signals representing images of the reference intensity plate different from the amplification factor for a use in the case where the amplification means amplifies signals representing images of the image document.

\* \* \* \* \*

UNITED STATES PATENT AND TRADEMARK OFFICE
CERTIFICATE OF CORRECTION

PATENT NO.         : 6,920,251 B2
APPLICATION NO. : 09/901012
DATED               : July 19, 2005
INVENTOR(S)       : Hideyuki Toriyama It is certified that error appears in the above-identified patent and that said Letters Patent is hereby corrected as shown below:

column 13, line 54, change "value readings" to --value of readings--;

column 13, line 66, change "among plurality" to --among a plurality--; and column 14, line 5, change "become" to --becomes--.

Signed and Sealed this

Fifteenth Day of August, 2006

JON W. DUDAS
*Director of the United States Patent and Trademark Office*